Nov. 4, 1969  J. W. ROSS  3,476,101
GAS-FIRED OVEN
Filed Dec. 28, 1967  3 Sheets-Sheet 1
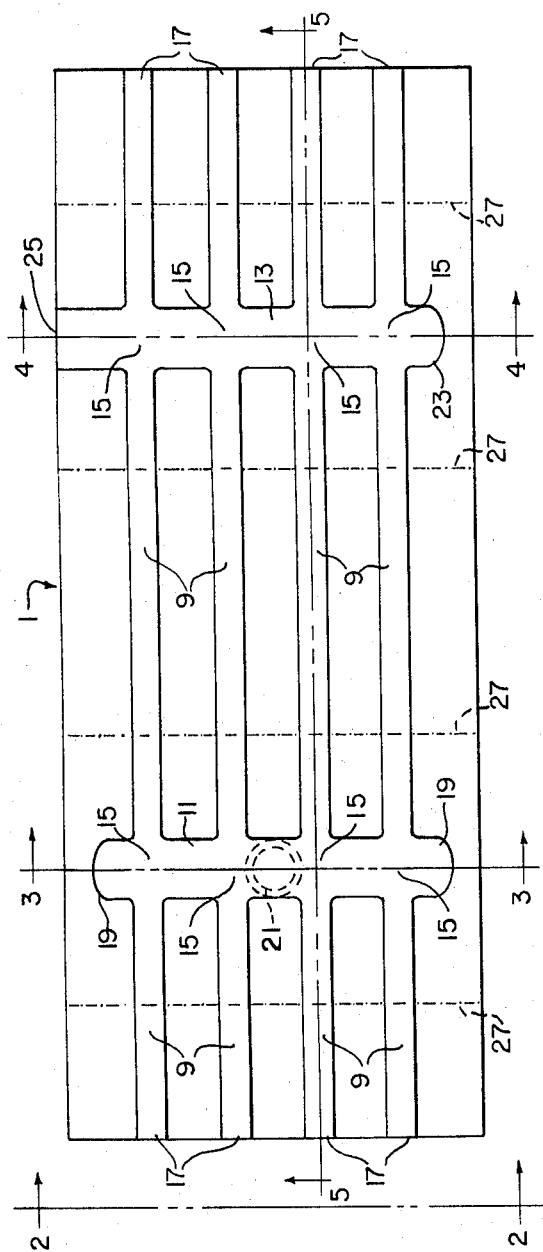
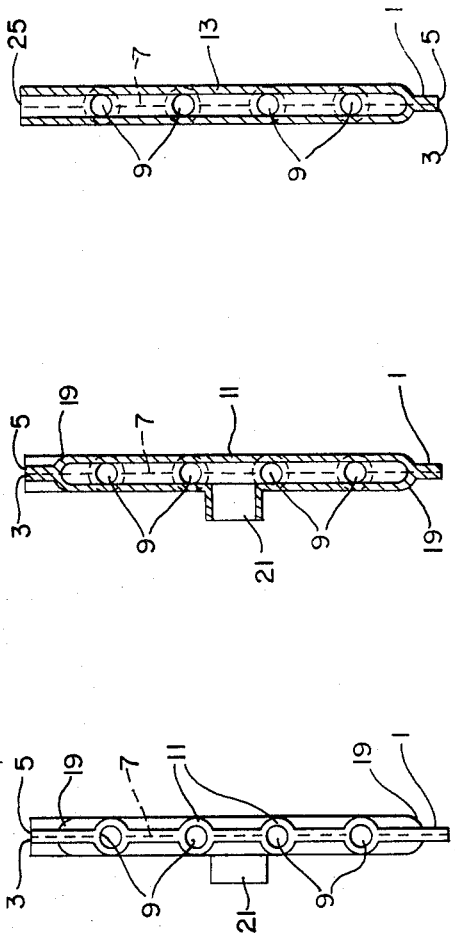
John W. Ross,
Inventor.
Koenig, Senniger,
Powers and Leavitt,
Attorneys.

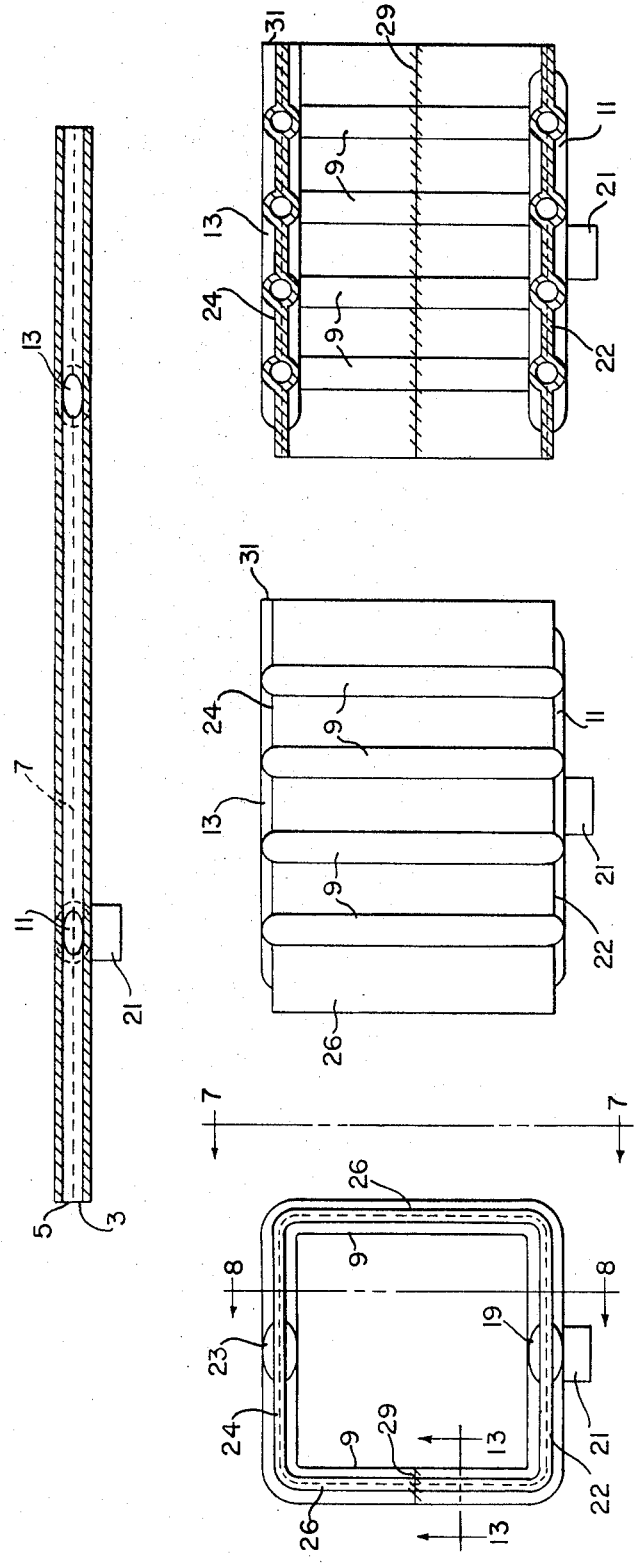

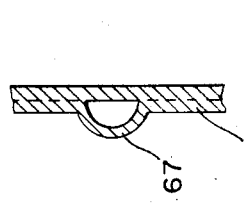
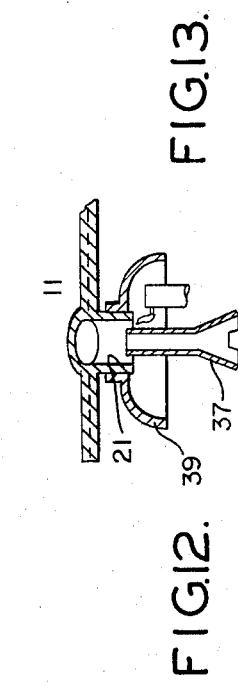
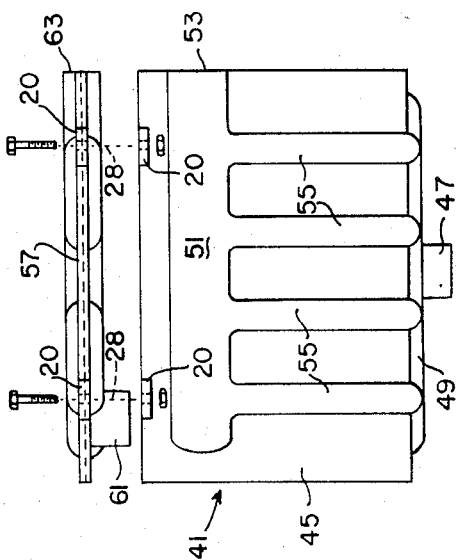
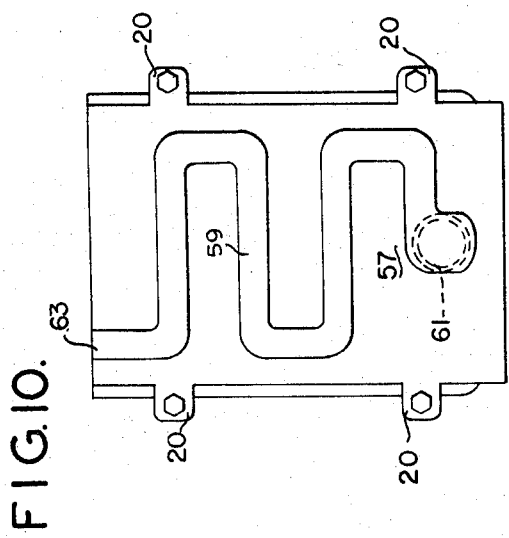
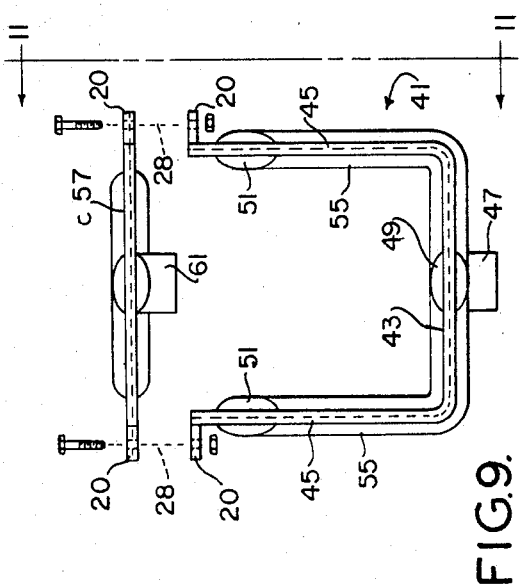

United States Patent Office 3,476,101
Patented Nov. 4, 1969

3,476,101
GAS-FIRED OVEN
John W. Ross, Cumberland, R.I., assignor to Texas Instruments Incorporated, Dallas, Tex., a corporation of Delaware
Filed Dec. 28, 1967, Ser. No. 694,221
Int. Cl. A21b 1/00; F28f 3/14
U.S. Cl. 126—19                                          8 Claims

ABSTRACT OF THE DISCLOSURE

A bonded composite multi-ply and tubulated metal sheet is used to form oven walls. The tubulations are formed by separations between component plies. The term "tube-in-sheet" is often used to designate such a composite. The tube-in-sheet composite is formed to make the desired oven walls, its tubulation being provided with gas-fired inlet means and one or more outlet means, the latter for making suitable flue connections. Combustion is controlled to occur at rates to provide cooking temperatures or to burn off undesirable charred spilled material from the oven walls, so as to make the oven self-cleaning.

---

The invention relates primarily to heating ovens for cooking stoves, ranges and the like but it is also useful for industrial furnaces. It has been proposed to use tube-in-sheet composite material for conventionally gas-heated oven walls and to place electrical heating coils in the un-fired tubulations to heat the oven to a high temperature such as 900° F. to burn off carbonized and like encrustations incurred under ordinary cooking temperatures which extend up to 550° F. or so. Such an electrical self-cleaning arrangement requires costly dual gas and electrical heating arrangements and a large amount of electrical power. My invention comprises a tube-in-sheet type of oven in which controlled heating for both cooking and self-cleaning is provided without the need for heavy duty electrical wiring and at most, if desired, light-duty wiring for items such as a clock and/or lights.

It may be noted in connection with the following that there are various methods for making inflated tube-in-sheet composite materials, for example, (but without limitation) as disclosed in U.S. Patent 3,346,936, or in the U.S. patent application Ser. No. 389,934 filed by Edwin A. Miller on Aug. 17, 1964.

Summarizing, the invention has as its object an oven having gas-fired, tube-in-sheet walls providing for controlled gas-fired heating for both cooking and self-cleaning. Other objects and features will be in part apparent and in part pointed out hereinafter.

FIG. 1 is a plan view of a tube-in-sheet composite made for constructing an oven according to the invention;

FIGS. 2, 3 and 4 are cross sections taken on lines 2—2, 3—3 and 4—4 of FIG. 1, respectively;

FIG. 5 is a longitudinal section taken on line 5—5 of FIG. 1;

FIG. 6 is an end view of an oven having four heating walls made from a tube-in-sheet such as illustrated in FIG. 1;

FIG. 7 is a right side elevation of FIG. 6;

FIG. 8 is a vertical section taken on line 8—8 of FIG. 6;

FIG. 9 is an exploded end view of a two part oven;

FIG. 10 is a plan view of the upper part of the oven of FIG. 9;

FIG. 11 is a right elevation of FIG. 9;

FIG. 12 is a detail view of a gas-firing inlet;

FIG. 13 is an enlarged detail section taken on line 13—13 of FIG. 6 showing a doubly protruding tubulation; and FIG. 14 is a view similar to FIG. 13 showing a singly protruding tubulation.

The drawings being illustrative are not to scale. Corresponding characters indicate corresponding parts throughout the several views.

Referring now more particularly to FIGS. 1–5, numeral 1 illustrates a rectangular composite metal sheet having component layers 3 and 5 which are solid-phase bonded throughout their interfaces, as indicated by the dotted lines 7, except at integral longitudinal tubulations 9 and at larger cross-connected tubulations 11 and 13. The cross connections are numbered 15. The ends of the longitudinal tubulations 9 are open at the endwise short margins of the rectangular composite as shown at numerals 17. The transverse tubulation 11 which functions as a gas inlet heating manifold is closed at its ends as shown at 19 and is provided with a central gas inlet nipple 21. The other tubulation 13 is closed at one end as shown at 23 and open on one longitudinal margin of the composite as shown at 25. It acts as a gas-heating outlet collector manifold. In the oven the tubulations 9 act as gas-heating distributor passages between the distributor and collector tubulations 11 and 13, as will appear.

To construct an oven, the composite of FIG. 1 is deformed by bending along the broken lines 27 (FIG. 1) into a prismatic shape as shown in FIGS. 6–8. Strangulating pinching in of the tubulations at their bends may be prevented, for example, by infilling of sand or other particulate material before bending, followed by flushing after bending to remove it. It is also feasible when constructing the tubulated composite to provide crinkling or the like in the tubulation where bending is to occur in order to prevent strangulation. The end margins after bending are welded, as shown at 29, to form sealed connections between the opposite open ends 17 of the tubulations 9. The arrangement is such that the firing nipple 21 is at the bottom and the outlet 25 is at the top. The bottom of this oven is numbered 22, the top 24 and the side walls 26. It will be understood that the oven will be provided with a suitable door forming a front wall and also with a suitable back wall (not shown).

FIG. 12 shows a gas-firing arrangement that may be used for the nipple 21. It comprises a gas jet 31 connected through a gas control valve 35 with a gas pressure line 33. Numeral 37 indicates a primary air injection nozzle through which gas and primary air are introduced into the nipple 21. Numeral 39 indicates a secondary inlet to provide air for firing into the nozzle 21 to inject hot gas into the distributor manifold 11. The cross connections 9 carry the hot gas from manifold 11 across the side walls to the collector manifold 13.

Referring to FIGS. 9–11, numeral 41 shows a U-shaped lower oven section forming the oven bottom 43 and side walls 45. At 49 is an inlet manifold having a firing inlet 47 such as above described. At 51 are outlet manifolds in the sides 45, each of which leads to an outlet 53 to provide for flue connections. Distributor passages 55 connect the manifolds 49 and 51. At 57 is shown a separate top wall in which is a sinuous tubulation 59 having a firing inlet 61 and an outlet 63. Separate firing means for the firing inlet 61 are provided by arrangements such as illustrated in FIG. 12. At numerals 20 are shown lugs for the reception of bolting means 28 illustrated in FIGS. 9 and 11, whereby the top wall 57 may be attached to the U-shaped bottom portion 41 to form a complete oven having the top 57, bottom 43 and sides 45. It is possible with this form of the invention to carry the top wall 57 at a temperature different from that of the bottom and side walls which is useful for obtaining high-temperature top-browning and like effects such as the broiling of things being cooked in the oven.

As shown in FIG. 13, the tubulation illustrated forms opposite bulges 65 each of which is an integral part of one of the sheets 30 of the composite. If it is desired to have no bulges on the inside or the outside of an oven a composite such as shown in FIG. 14 may be used. In this form a bulge 67 is integral with only one of the composite sheets 30 employed, the other sheet 30 being left flat (see Patent 3,346,936).

From the above it will be seen that by control of, firing at valve 35 that the oven temperature may be controlled, as, for example, in the usual range for cooking of from 240° F. to 550° F. or so. Also the oven may be self-cleaned of carbonized material spilled during cooking by increasing the heating rate to raise the temperature, as, for example, to 900° F. or so to burn off the carbonized material.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A heating oven comprising walls formed of composite tube-in-sheet material, deformed to define an oven enclosure, the tubulation of the sheet including at least one transverse inlet manifold passageway at least one transverse outlet collector manifold passageway, and at least one longitudinal distributor passageway extending between said inlet and outlet manifold passageways and providing fluid communication therebetween, means for firing a combustible mixture of fuel into said inlet passageway and through said distributor passageway to said collector passageway, and means for controlling the firing rate to produce various oven heating temperatures.

2. A heating oven according to claim 1 wherein said firing rate of said firing means is of a range sufficient to produce temperatures in the oven in a range for cooking and self-cleaning by heating.

3. An oven according to claim 1 wherein the oven has tubulated bottom, side and top walls, the tubulation in the bottom wall having a firing inlet and forming the inlet manifold passageway, the tubulation in said top wall having an outlet and forming the outlet collector manifold, the remaining tubulations forming the distributor passageways and defining connections through the side walls between said inlet and outlet manifolds.

4. An oven comprising bottom, side and top walls formed integrally of tube-in-sheet composite material bent to form said walls, the tubulation of said composite being formed as a transverse hot-gas inlet manifold in one of said walls, a transverse flue gas outlet manifold in another of said walls vertically spaced from said one wall and a plurality of longitudinal hot-gas distributor connections extending between and connecting said manifolds transversing the bottom, side and top walls.

5. An oven according to claim 4 wherein the cross sections of said manifolds are greater than the cross sections of the hot-gas distributor connections.

6. An oven comprising an integral bent U-shaped tube-in-sheet composite forming a bottom wall and two side walls of the oven, the tubulation of the composite including a bottom inlet manifold in said bottom wall and an upper outlet manifold in each of said side walls, connecting distributor passages between said inlet manifold and said outlet manifolds, and a top wall attached to said U-shaped member, said top wall comprising a separate tube-in-sheet composite the tubulation of which includes a firing inlet and an outlet so as to provide independent temperature control of said top wall with respect to said bottom wall and said side walls.

7. An oven according to claim 4 wherein the tubulation bulges from both faces of the composite.

8. An oven according to claim 4 wherein the tubulation bulges from one face only of the composite.

References Cited
UNITED STATES PATENTS

| | | | |
|---|---|---|---|
| 2,995,807 | 8/1961 | Gibbs | 165—170 X |
| 3,314,475 | 4/1967 | Yalyi | 165—170 |
| 3,324,844 | 6/1967 | Huffman. | |
| 3,346,936 | 10/1967 | Miller et al. | |
| 3,364,912 | 1/1968 | Dills et al. | |

EDWARD G. FAVORS, Primary Examiner

U.S. Cl. X.R.

165—170